United States Patent
Benson et al.

(10) Patent No.: US 10,735,400 B2
(45) Date of Patent: Aug. 4, 2020

(54) MECHANISM OF PASSING SECURITY TOKENS THROUGH BOTH UNTRUSTED AND VALIDATING INTERMEDIARIES

(71) Applicant: VMware, Inc., Palo Alto, CA (US)

(72) Inventors: Mark Benson, Workingham (GB); Emily Hong Xu, Palo Alto, CA (US); Brett Schoppert, Leesburg, VA (US)

(73) Assignee: VMware, Inc., Palo Alto, CA (US)

( * ) Notice: Subject to any disclaimer, the term of this patent is extended or adjusted under 35 U.S.C. 154(b) by 272 days.

(21) Appl. No.: 15/895,844

(22) Filed: Feb. 13, 2018

(65) Prior Publication Data
US 2019/0253408 A1    Aug. 15, 2019

(51) Int. Cl.
*H04L 29/06*    (2006.01)
*G06F 9/455*    (2018.01)
*H04L 9/32*    (2006.01)

(52) U.S. Cl.
CPC ...... *H04L 63/0815* (2013.01); *G06F 9/45558* (2013.01); *H04L 9/3213* (2013.01); *H04L 63/0807* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 7,016,875 B1* | 3/2006 | Steele | ................... | G06Q 10/00 705/44 |
| 8,613,070 B1* | 12/2013 | Borzycki | ............ | G06F 21/6218 726/8 |
| 8,955,080 B2* | 2/2015 | Brunswig | ............... | G06F 21/41 713/158 |
| 9,106,642 B1* | 8/2015 | Bhimanaik | ........... | G06F 21/335 |
| 2008/0021997 A1* | 1/2008 | Hinton | ................ | H04L 63/0815 709/225 |
| 2009/0271847 A1* | 10/2009 | Karjala | ............... | H04L 63/0807 726/6 |

(Continued)

OTHER PUBLICATIONS

Jafary, Peyman et al. Enhancement of security in the hierarchy model of control and automation by applying Single Sign-On approach for web services. 2012 Tenth International Conference on ICT and Knowledge Engineering. https://ieeexplore.ieee.org/stamp/stamp.jsp?tp=&arnumber=6408563 (Year: 2012).*

(Continued)

*Primary Examiner* — Jeremiah L Avery
(74) *Attorney, Agent, or Firm* — Patterson + Sheridan LLP (57) ABSTRACT

Disclosed is a system and technique for validating a user for a single sign on without exposing secure information about the user to any part of the system except the connection server and the identity provider. In the technique, instead of relying directly on a SAML assertion, the technique uses an artifact representing the assertion and wraps the artifact in an access token. The access token is able to carry the artifact through one or more gateways on its way to a connection server without revealing any security information. Upon the access token being verified by either the gateway or the connection server, the artifact can be extracted from the access token and verification of the user for the single sign on can proceed between only the connection server and the identity provider.

21 Claims, 5 Drawing Sheets

(56) References Cited

U.S. PATENT DOCUMENTS

2018/0060572 A1* 3/2018 Singleton ............... G06F 21/53

OTHER PUBLICATIONS

Niemiec, Marcin; Kolucka-Szypula, Weronika. Federated identity in real-life applications. 2015 European Conference on Networks and Communications (EuCNC). https://ieeexplore.ieee.org/stamp/stamp.jsp?tp=&arnumber=7194124 (Year: 2015).*

* cited by examiner

MECHANISM OF PASSING SECURITY TOKENS THROUGH BOTH UNTRUSTED AND VALIDATING INTERMEDIARIES

BACKGROUND

In a distributed system of servers and clients, it is often desirable to provide to the clients a Single Sign On (SSO) service. As long as the client uses the same access point, say a workstation, this service avoids the client having to re-authenticate his or her self with any other server that is part of the distributed system. One way to achieve SSO is to use security tokens, where such tokens are assertions described by the Security Assertion Markup Language (SAML), to pass authentication information throughout various domains within the distributed system. However, security tokens may not be sent as-is because the security tokens contain user sensitive information.

To avoid exposing sensitive information, another feature, called an artifact, is used in conjunction with the security token. The artifact is a reference (sometimes referred to as a one-time use opaque handle) to one or more assertions of the security token where the assertion contains key user logon information. The artifact is resolved between the server providing the service to the client and an artifact resolution service available in an identity provider.

Figure 1:
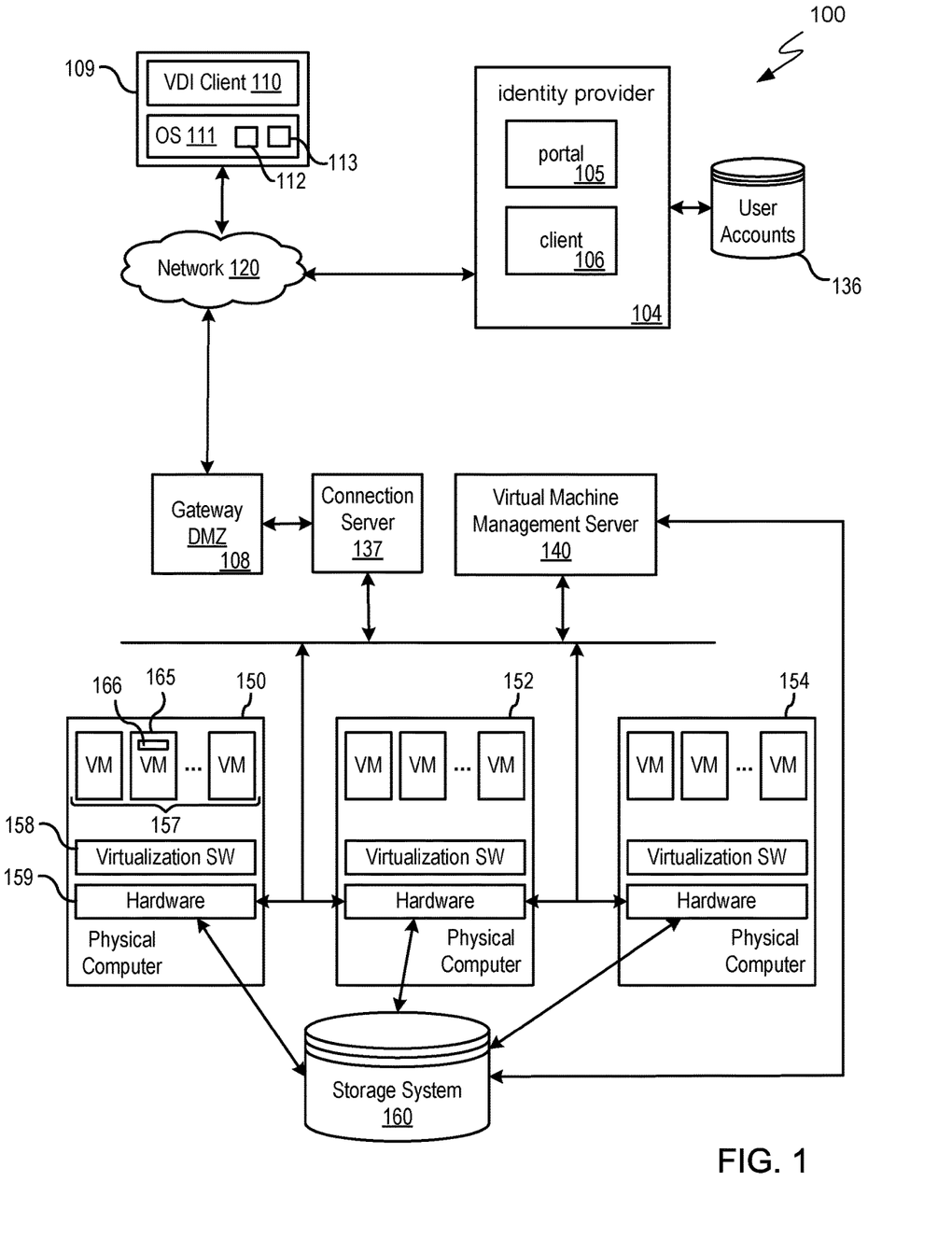
FIG. 1 illustrates components of a virtualized desktop infrastructure (VDI) system 100 in which one or more embodiments of the present invention may be implemented.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI client 110, run on operating systems of local computing devices, e.g., client machine 109 on top of an operating system (OS) 111. VDI clients provides an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others. VDI system 100 also includes an identity provider 104, which includes a network portal 105 and a corresponding client 106 for each VDI client 110. Identity provider 104 connects to user accounts 136 including user log-in information and provide facilities for a single sign on service. The system 100 further includes a gateway/DMZ 108 which may be configured to perform certain client verifications and a connection server 137 that manages connections between VDI clients and desktops running in virtual machines 157 or other platforms. Connection server 137 may run on separate servers or in separate virtual machines running on the same server or different servers. In the embodiments of the present invention illustrated herein, desktops are running in virtual machines 157 and virtual machines 157 are instantiated on a plurality of physical computers 150, 152, 154, each of which includes virtualization software 158 and hardware 159, is controlled by a virtual machine management server 140, and is coupled to a shared persistent storage system 160. All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

Figure 2:
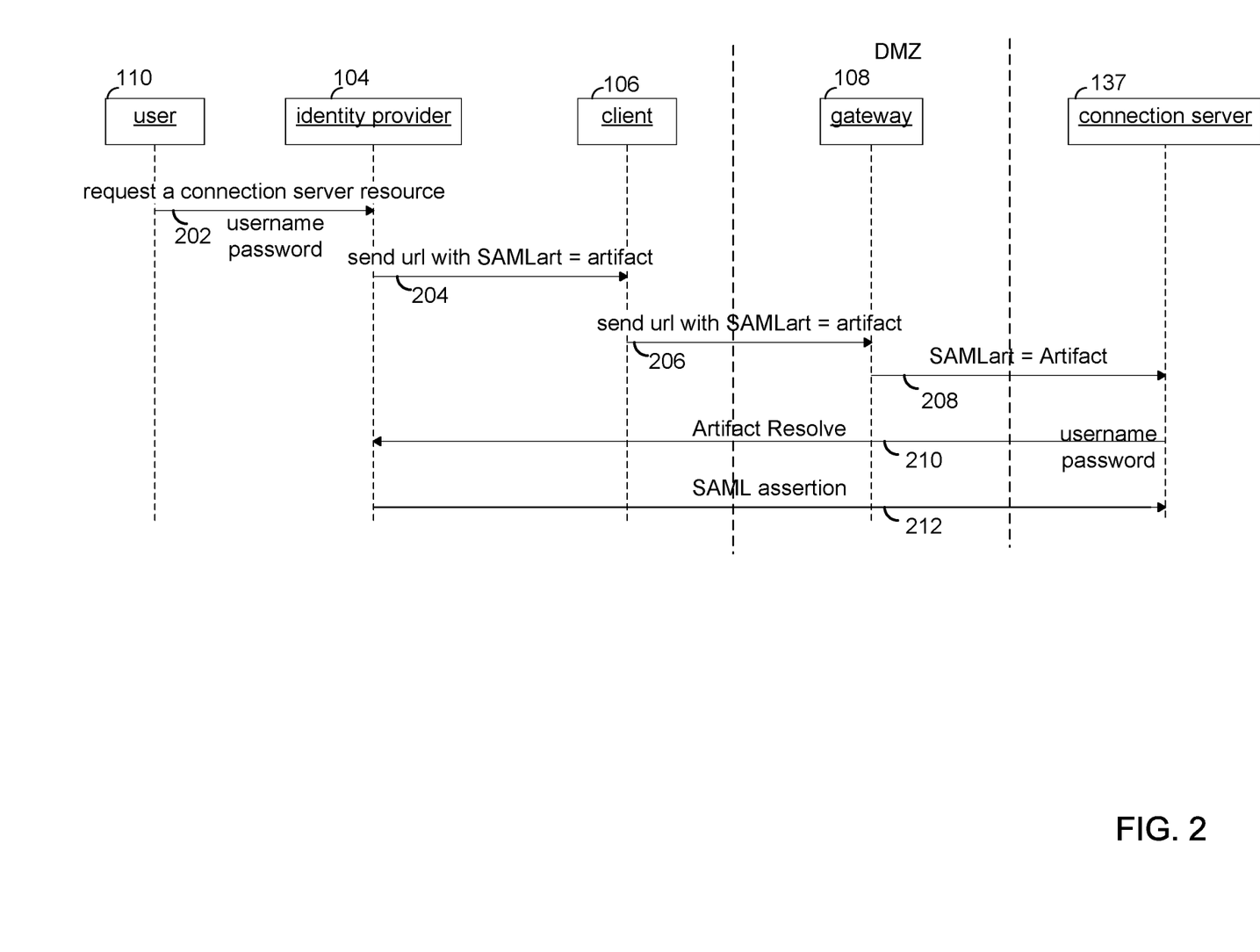
FIG. 2 depicts an example flow for the SSO service.

FIG. 2 depicts an example flow for an SSO service. In step 202, user 110, a VDI client, launches a request for a resource on a server, which in this case is a connection server 137 such as the Horizon Connection Server®. Next, in step 204, an identity provider 104, such as vIDM, forwards the request to client 106, where the request now contains an SAML artifact. In step 206, client 106, sends an URL with the artifact to gateway 108. In step 208, gateway 108 sends the artifact to connection server 137. In step 210, connection server 137 resolves the artifact with identity provider 104 and in step 212 receives the SAML assertion referenced by the artifact. The resolved assertion contains the user's UPN and AD password, where UPN is the user principal name based on Internet Standard RFC 822 and AD is a Microsoft® Active Directory. From the resolved assertion, connection server 137 permits user 110 to access the requested resource.

However, the example flow depicted in FIG. 2 encounters some difficulties. If an gateway though which the security token passes requires authentication or validation before letting the security token through, then the example flow can fail because the gateway cannot retrieve, view or validate the security token with the artifact. The security token with the artifact can only be resolved by the connection server 137.

Figure 3:
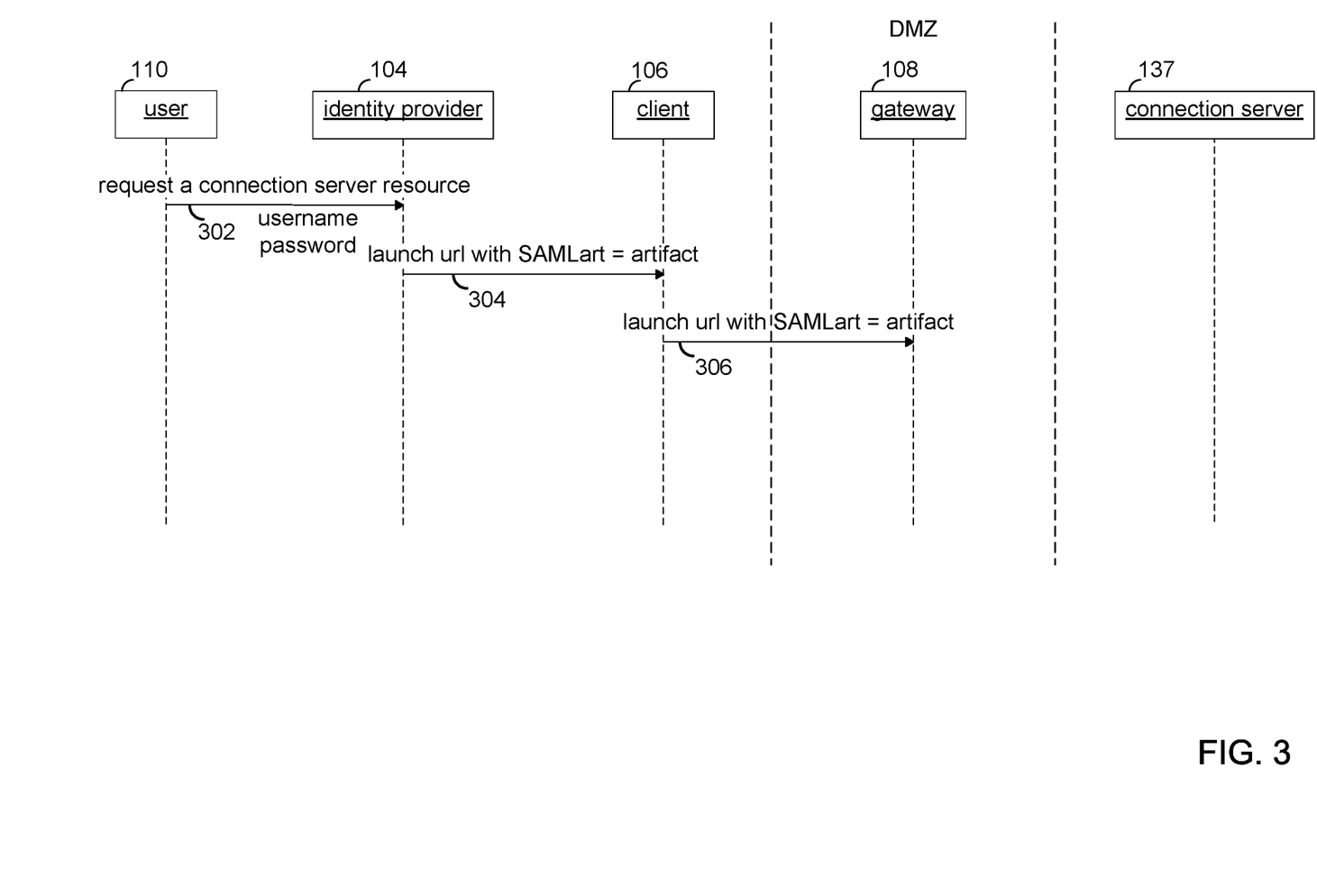

FIG. 3 depicts an example flow in which the flow fails to permit a user single sign on because the gateway cannot resolve the artifact. In step 302, user 110 launches a request for a resource controlled by connection server 137. In step 304, identity provider 104 sends to client 106 an URL with a SAML security token which includes an artifact referencing the key user login information. In step 306, client 106 sends the URL with the token containing the artifact to a validating type of gateway 108, such as an F5 Access Policy Manager (APM). Gateway 108 attempts to verify the security token but is unable to do so, because the artifact is issued only for the connection server, which is configured to resolve it using identify provider 104. Thus, gateway 108 blocks the login request from reaching the connection server and the user cannot be granted a single sign on session with the system.

It is desirable to have a way to send a security token to a server with a guarantee that the security token will pass through any and all gateways and allow the security token to accomplish the goal of permitting a Single Sign On (SSO).

SUMMARY

One embodiment is a method for performing a single sign on (SSO) service for a client in a system having a server that provides resources for the client. The method includes receiving a request from the client to access a resource provided by the server, where the request contains an artifact referencing a security token and the security token contains an assertion for authenticating the client and an assertion for authorizing the client for a single sign on service with the server, embedding the artifact in an access token, receiving a request from the server to resolve the artifact after the access token is validated, the artifact is extracted from the access token and the server is in possession of the artifact, and sending the assertion to the server, where assertion permits the client to access the requested resource provided by the server.

Further embodiments of the present invention include a non-transitory computer readable storage medium that includes instructions that enable a processing unit to implement one or more aspects of the above method, as well as a computer system configured to implement one or more aspects of the above method.

BRIEF DESCRIPTION OF THE DRAWINGS

FIG. 3 depicts an example flow in which the flow fails to permit a user single sign on.

DETAILED DESCRIPTION

Figure 4:
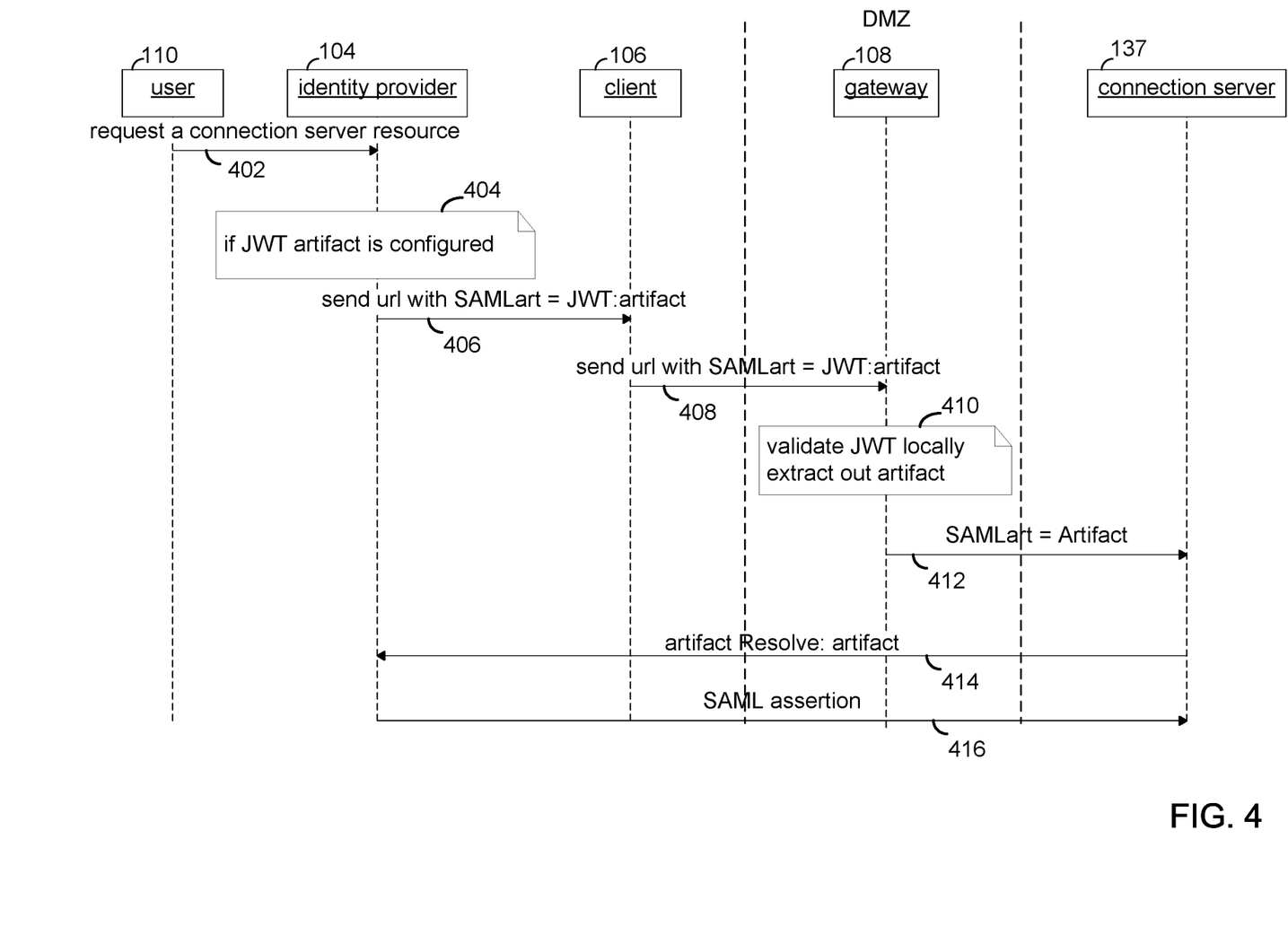
FIG. 4 depicts an example flow in which the flow guarantees delivery of the artifact to the connection Server.

FIG. 4 depicts an example flow in which the flow guarantees delivery of the artifact to the connection Server, which can resolve the artifact with the identify provider. In step 402, user 110 sends a request to login to identify provider 104. At identity provider 104, in step 404 the artifact is included in an access token such as a JSON Web Token (JWT).

An example JSON Web Token (JWT) is depicted in Table 1.

TABLE 1

| JSON Web Token |
|---|
| header |
| payload |
| signature |

In the token, the header, payload and signature are each base64 URL encoded strings separated by dots. The header is depicted in Table 2.

TABLE 2

| JWT header |
|---|
| type |
| hashingAlgorithm |

In Table 2, type specifies a token type and the hashingAlgorithm specifies the algorithm used for the hashes in the signature.

The payload, which includes the artifact, of the JWT is depicted in Table 3.

TABLE 3

| JWT payload |
|---|
| iss |
| sub |
| aud |
| exp |
| nbf |

TABLE 3-continued

| JWT payload |
|---|
| iat |
| jti |
| artifact |
| upn |
| other fields |

In the payload, iss specifies a an issuer of the JWT, sub specifies the token subject, and specifies the token audience, exp specifies the expiration date, nbf specifies a time at which processing of the token can start, iat specifies an issue time, jti specifies a unique id, artifact specifies the artifact that references the SAML assertion, and upn (user principal name) specifies the user's email address or username@domain if the upn does not exist.

The signature portion of the token is formed by base64URL encoding the header, base64URL encoding the payload and concatenating them with a period as a separator. This quantity represents an unsigned token, named unsignedToken. Thus, unsignedToken=base64URLencode(header)+"."+
base64URLencode(payload), where + means concatenation. A combination of a hash and a message authentication code (MAC) is then formed of the unsigned token using the issuer's private key. In one embodiment, the hash is SHA256 and the message authentication coding is HMAC, as specified in the header. Thus, the signature becomes HMAC-SHA256(key, unsignedToken), where the key is the issuer's private key. The signature can then be validated using the issuer's public key.

Returning to discussion of FIG. 4, in step 406, identity provider 104 sends an URL with the JWT to client 106. In step 408, client 106 sends the URL with the JWT to gateway 108. In step 410, gateway 108 validates the JWT. In one embodiment, this includes verifying that the issuer specified in the iss field is a trusted issuer. In another embodiment, this includes verifying the lifetime of the token via the issue date and the expiration date specified in the iss and exp fields. Typically, the JWT is given a short life time. In yet another embodiment, gateway 108 can add a one-time use policy to protect against replay attacks. In yet another embodiment, verification includes checking the audience field to determine that the recipients are the ones intended. If the verification succeeds, gateway 108 then extracts the artifact from the token. In step 412, gateway 108 sends the artifact to the connection server 137. In step 414, connection server 137 resolves the artifact with identity provider 104. At step 416, identity provider 104 sends the assertion referenced by the artifact to connection server 137, which then permits the user to access the requested resource.

Figure 5:
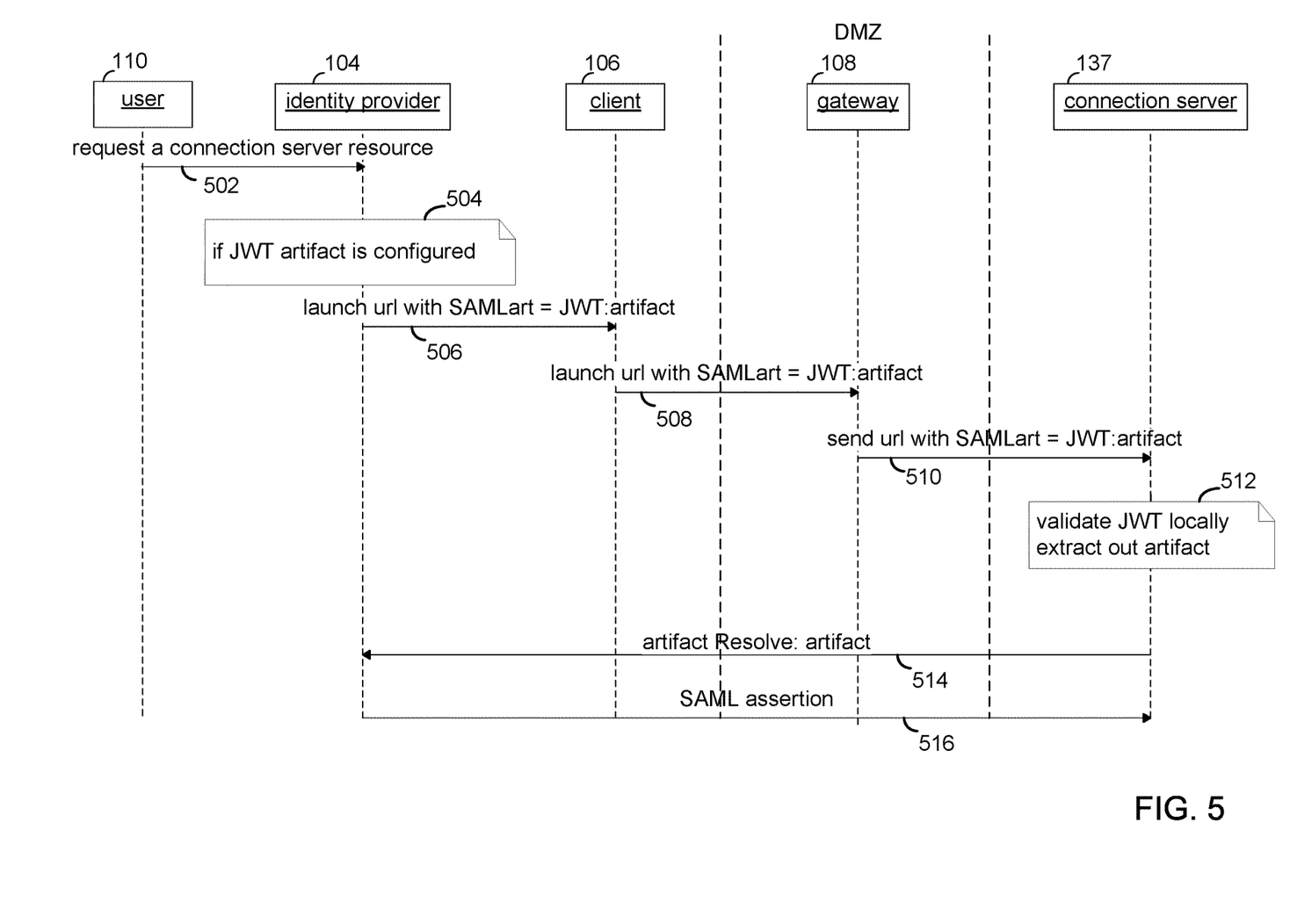
FIG. 5 depicts an alternative embodiment to that of FIG. 4.

FIG. 5 depicts an alternative embodiment to that of FIG. 4. Steps 502, 504, 506 and 508 are respectively similar to steps 402, 404, 406 and 408 in FIG. 4. However, in step 510, gateway 108 sends the URL with the artifact to connection server 137, instead of validating and extracting the artifact, as in step 410 of FIG. 4. In step 512, connection server 137 validates the JWT and extracts the artifact from the JWT. In step 514, connection server 137 resolves the artifact with identity provider 104 and in step 516 receives the assertion with the security information that permits the user to sign on an access the requested resource.

In this manner, no security information is exposed to any gateway because only the artifact is transmitted and the security token is resolved only between the connection server and the identity provider.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for performing a single sign on (SSO) service for a client in a system having a server that provides resources for the client, comprising:
   receiving a request from the client to access a resource provided by the server, wherein the request contains an artifact referencing a security token and the security token contains an assertion for authorizing the client for a single sign on service with the server;
   embedding the artifact in an access token, wherein the access token includes, in addition to the artifact, one or more fields for validating the access token itself;
   after the access token is validated, the artifact is extracted from the access token and the server is in possession of the artifact, receiving a request from the server to resolve the artifact; and
   sending the assertion to the server, wherein the assertion permits the client to access the requested resource provided by the server.

2. The method of claim 1, wherein the security token describes the assertion in Security Assertion Markup Language (SAML).

3. The method of claim 1, wherein a gateway residing between the client and the server verifies the access token, extracts the artifact from the access token and sends the artifact to the server.

4. The method of claim 3, wherein the gateway verifies issuance and expiration date of the access token.

5. The method of claim 3, wherein the gateway verifies an issuer of the access token and an intended audience of the access token.

6. The method of claim 1, wherein the server is a virtual desktop connection server that uses the assertion to connect the client to a virtual machine hosting a desktop.

7. The method of claim 1, wherein the server verifies the access token and extracts the artifact from the access token.

8. The method of claim 1, wherein the access token comprises a JavaScript object notation (JSON) web token (JWT).

9. A non-transitory computer readable medium containing instructions for performing a single sign on (SSO) service for a client in a system having a server that provides resources for the client and which, when executed by one or more processors, perform the steps of:
   receiving a request from the client to access a resource provided by the server, wherein the request contains an artifact referencing a security token and the security token contains an assertion for authorizing the client for a single sign on service with the server;

embedding the artifact in an access token, wherein the access token includes, in addition to the artifact, one or more fields for validating the access token itself;

after the access token is validated, the artifact is extracted from the access token and the server is in possession of the artifact, receiving a request from the server to resolve the artifact; and sending the assertion to the server, wherein the assertion permits the client to access the requested resource provided by the server.

10. The non-transitory computer readable medium of claim 9, the security token describes the assertion in Security Assertion Markup Language (SAML).

11. The non-transitory computer readable medium of claim 9, wherein a gateway residing between the client and the server verifies the access token, extracts the artifact from the access token and sends the artifact to the server.

12. The non-transitory computer readable medium of claim 11, wherein the gateway verifies issuance and expiration date of the access token.

13. The non-transitory computer readable medium of claim 11, wherein the gateway verifies an issuer of the access token and an intended audience of the access token.

14. The non-transitory computer readable medium of claim 9, wherein the server is a virtual desktop connection server that uses the assertion to connect the client to a virtual machine hosting a desktop.

15. The non-transitory computer readable medium of claim 9, wherein the server verifies the access token and extracts the artifact from the access token.

16. A computer system comprising:
a client;
a server configured to provide resources for the client upon a successful sign on by the client; and
an identity provider connected between the client and the server and configured to:
 receive a request from the client to access a resource provided by the server, wherein the request contains an artifact referencing a security token and the security token contains an assertion for authorizing the client for a single sign on service with the server;
 embed the artifact in an access token, wherein the access token includes, in addition to the artifact, one or more fields for validating the access token itself;
 after the access token is validated, the artifact is extracted from the access token and the server is in possession of the artifact, receive a request from the server to resolve the artifact; and
 send the assertion to the server, wherein the assertion permits the client to access the requested resource provided by the server.

17. The computer system of claim 16, wherein the security token describes the assertion in Security Assertion Markup Language (SAML).

18. The computer system of claim 16,
further comprising a gateway residing between the client and the server;
wherein the gateway verifies the access token, extracts the artifact from the access token and sends the artifact to the server.

19. The computer system of claim 18, wherein the gateway verifies issuance and expiration date of the access token.

20. The computer system of claim 16, wherein the server is a virtual desktop connection server that uses the assertion to connect the client to a virtual machine hosting a desktop.

21. The computer system of claim 16, wherein the server verifies the access token and extracts the artifact from the access token.

* * * * *